(12) United States Patent  
Ramalingam et al.

(10) Patent No.: US 8,605,991 B2  
(45) Date of Patent: Dec. 10, 2013

(54) METHOD FOR GENERATING VISUAL HULLS FOR 3D OBJECTS AS SETS OF CONVEX POLYHEDRA FROM POLYGONAL SILHOUETTES

(75) Inventors: Srikumar Ramalingam, Cambridge, MA (US); Amit Agrawal, Somerville, MA (US); Yuichi Taguchi, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 357 days.

(21) Appl. No.: 13/077,505

(22) Filed: Mar. 31, 2011

(65) Prior Publication Data

US 2011/0211729 A1   Sep. 1, 2011

(51) Int. Cl.  
*G06K 9/00*   (2006.01)
(52) U.S. Cl.  
USPC .......................................... 382/154; 345/419

(58) Field of Classification Search  
None  
See application file for complete search history.

(56) References Cited

PUBLICATIONS

Jyh-Ming Lien, Nancy M. Amato, Approximate convex decomposition of polyhedra and its applications, Computer Aided Geometric Design, vol. 25, Issue 7, Oct. 2008, pp. 503-522, ISSN 0167-8396.*  
Furukawa et. al, "Carved Visual Hulls for image based modeling". Computer Vision—ECCV 2006. Lecture Notes in Computer Science vol. 3951, 2006, pp. 564-577.*

* cited by examiner

*Primary Examiner* — Claire X Wang  
*Assistant Examiner* — Thomas A James  
(74) *Attorney, Agent, or Firm* — Gene Vinokur; Dirk Brinkman

(57) ABSTRACT

A visual hull for a 3D object is generated by using a set of silhouettes extracted from a set of images. First, a set of convex polyhedra is generated as a coarse 3D model of the object. Then for each image, the convex polyhedra are refined by projecting them to the image and determining the intersections with the silhouette in the image. The visual hull of the object is represented as union of the convex polyhedra.

14 Claims, 3 Drawing Sheets

METHOD FOR GENERATING VISUAL HULLS FOR 3D OBJECTS AS SETS OF CONVEX POLYHEDRA FROM POLYGONAL SILHOUETTES

FIELD OF THE INVENTION

This invention related generally to generating visual hulls for 3D objects, and more particularly to generating visual hulls as sets of convex polyhedra from polygonal silhouettes.

BACKGROUND OF THE INVENTION

Shape reconstruction from silhouettes or occluding contours of a 3D object is used in many computer vision applications in diverse fields such as virtual reality, computer graphics, and 3D modeling. A visual hull is a maximal object shape that is consistent with the silhouettes of the object obtained from multiple camera positions. In principle, the visual hull can be obtained by an intersection of back-projected visual cones of all the silhouettes. However, practical implementation of a visual hull generation method is a non-trivial task when considering stability, accuracy, and segmentation and calibration errors.

The problem of reconstructing surfaces from occluding contours was first attempted by inferring 3D curvature properties from occluding contours. Most methods for visual hull generation are either volume based or surface based.

Volume Based Methods

Volume based methods usually generate the 3D volume of the object by discretization of the 3D space into a set of identically sized cubes, or voxels. Each voxel is projected onto an image, and is carved out if the voxel is outside the silhouette. Such methods have inherent limitations because a discrete approximation of the 3D shape that is obtained is usually subject to aliasing artifacts.

This can be avoided only by increasing the resolution of the volumetric representation. Thus, the run time of voxel carving depends on the number of images and resolution of volumetric representation, not on the intrinsic complexity of the visual hull. Those representations are also biased by the choice of the coordinate system. In addition, volumetric visual hulls tend to suffer from quantization artifacts, and require an extra step, e.g., a marching cubes method to convert the visual hull to polygonal models.

Voxel carving can be improved by performing conforming Delaunay triangulation of visual hull surface points obtained along viewing edges. However, that method also either keeps or discards each tetrahedron based on the projection of its centroid, and does not modify its shape. Moreover, centroids of the Delaunay tetrahedrons closer to the surface can project outside some silhouettes, which require increasing the number of contour points.

Surface Based Methods

Attempts to reconstruct the elements of the object surface with surface patches or individual strips show that the visual hull surface is a projective topological polyhedron made of curve edges and faces connecting them. The visual hull is generated via locating frontier and triple points by finding a sparse set of corresponding points observed by pairs and triplets of cameras.

Several methods assume local smoothness and determine rim and frontier points using epipolar constraints based on second-order approximation of the surface. However, the orientations reverse at frontier points leading to an approximate topology.

One high quality visual hull method first retrieves viewing edges. Local connectivity and orientation information are then used to incrementally construct a mesh using epipolar correspondences. A final walk-through is also required to identify the planar contours for each face of the polyhedron. Such methods can face difficulties in presence of segmentation and calibration errors, i.e., an epipolar line corresponding to a viewing edge cannot intersect the silhouette. Thus, explicit handling of such cases is required, either by modifying local geometry or silhouettes.

SUMMARY OF THE INVENTION

The embodiments of the invention provide a method for generating a polyhedral visual hull from polygonal silhouettes. While conventional voxel carving methods use a fixed cubic voxels as a 3D primitive, our 3D primitives are convex polyhedra or "bricks" that adapt to the shape of the visual hull. This overcomes the inherent limitations of voxel carving in terms of quantization and aliasing artifacts.

We generate the visual hull as a combination of convex bricks by determining the intersection of visual cones. We compute 3D intersections only between convex polyhedra, which can be precisely determined using linear programming (LP).

Our method automatically results in a watertight mesh, avoids explicit computation of triple points and frontier points, does not require local orientation or connectivity rules, and can handle holes. The method is stable under segmentation and calibration errors without the need to explicitly modify the silhouette and local geometry.

While previous methods treat each part of the silhouette equally, our method allows parts of the visual hull to be refined independently in a coarse-to-fine manner.

NOTATIONS AND PRELIMINARIES

Figure 1:
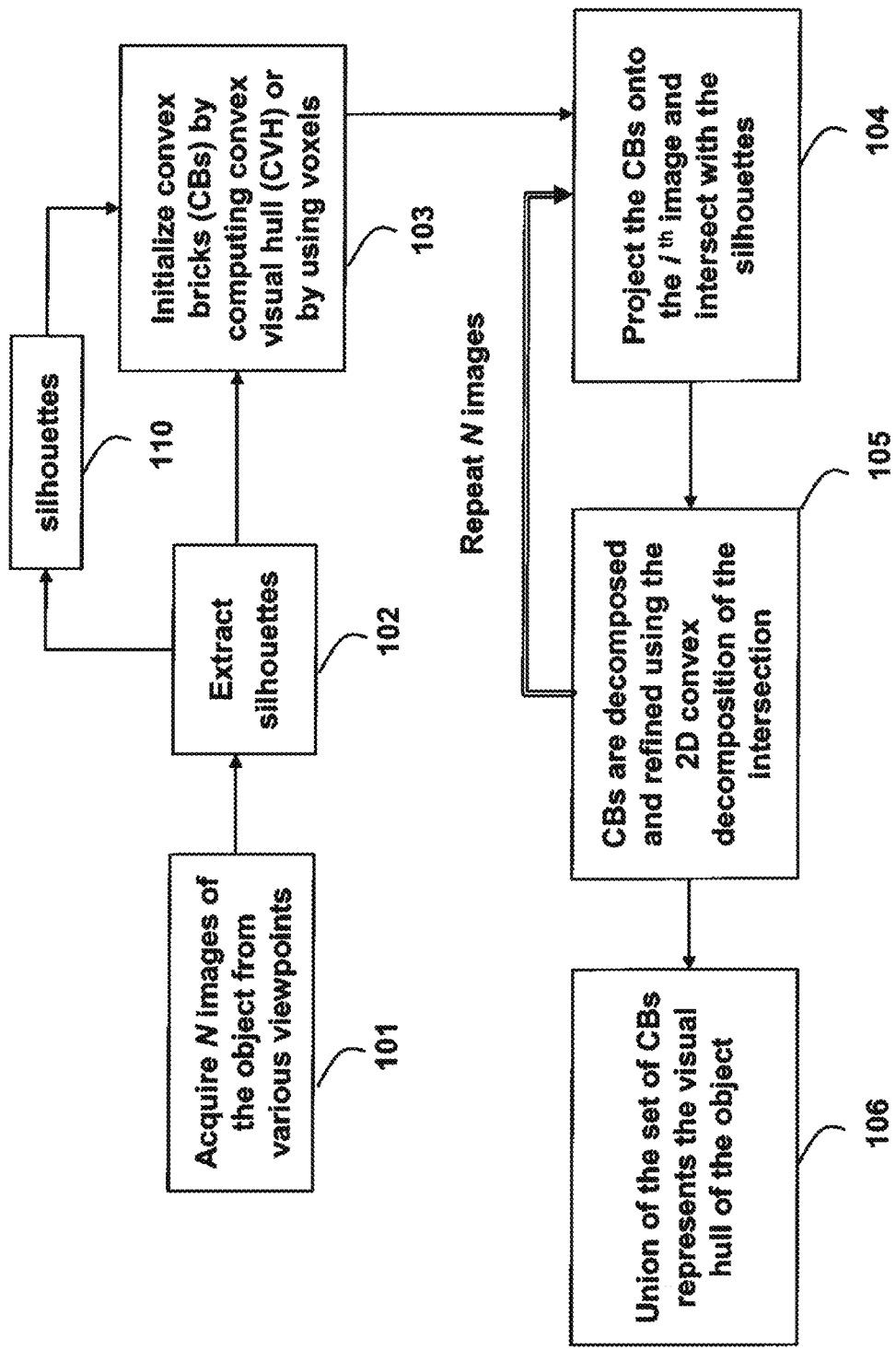
FIG. 1 is a flow diagram of a method for generating a visual hull of a 3D object according to embodiments of the invention.

We consider a 3D object observed by N pinhole cameras with a known calibration. Let $I_i$ denote a set of images, and $C_i$ an occluding contour in each image. We assume that the silhouette in each image is a set of polygonal contours. A viewing cone $V_i$ associated with the occluding contour $C_i$ is the closure of the set of rays passing through points inside the contour $C_i$ and through the center of projection of image $I_i$.

The visual hull (VH) is defined as the intersection of all viewing cones $$VH = \cap V_i. \qquad (1)$$

Let $e_{ij}$ and $v_{ij}$ respectively denote a set of 2D edges and 2D vertices of the contour $C_i$. The inside region of an occluding contour is the closed region of the image plane which it bounds. Each edge $e_{ij}$, along with the center of the camera, define an infinite cone surface in 3D. Let $\alpha_{ij}$ denote a normal of the surface, and $d_{ij}$ a distance from surface to an origin.

Intersection of 3D Convex Polyhedra

A convex polyhedron can be represented as an intersection of supporting half-spaces (half-space or H-representation), or a unique minimal set of extreme vertices (vertex or V-representation). Each representation can be obtained from the other.

Recovering extreme points from the H-representation is known as the vertex enumeration problem, and recovering half-spaces from the extreme points is known as the facet enumeration problem. Because the half-spaces can be represented as linear inequalities, a convex polyhedron is regarded as the set of solutions to the system of linear inequalities, given by its half-spaces. Intersection of the convex 3D polyhedra is equivalent to determining a reduced set of inequalities from the union of the inequalities corresponding to the given polyhedra, which can be performed using the LP.

If the occluding contour $C_i$ is convex, the viewing cone becomes a convex 3D unbounded polyhedron. In that case, all 3D points x lying on or inside the visual hull satisfy $$a_{ij}x \leq d_{ij} \text{ for all } j. \tag{2}$$

This inequality specifies the visual hull constraint that the projection of x is on or inside the contour. Thus, each cone face represents a linear inequality or a half-space in $R^3$ for convex occluding contours. Intersection of visual cones can be performed by combining these linear equalities and solving the LP.

2D Polygon Operations

Determining the intersection of 2D polygons is referred to as polygon clipping. We employ 2D polygon clipping to simplify the intersection of a brick (convex polyhedron) with the visual cone of the silhouette.

Visual Hull Generation

Our method generates a coarse 3D model and then refines the model by partitioning the model into convex bricks. It is noted that a convex decomposition of the 3D shape is not necessarily unique. Our method generates the visual hull of the 3D object as a union of convex bricks. The size and shape of the individual convex bricks depend on the number of viewpoints, their locations, and occlusions in each silhouette. We merge adjacent convex bricks, whose union remain convex, to reduce the total number of primitives in the final visual hull.

FIG. 1 shows a flow diagram of our method. A set of images 101 of a 3D object is acquired by a camera from various viewpoints with known poses around the object. This can be achieved, for example, by attaching a calibrated camera to a robot arm and moving the camera around the object. The silhouettes 110 of the object are extracted 102 using object segmentation or background subtraction methods. The extracted silhouettes are used to initialize 103 the process by computing a coarse 3D model as a set of convex bricks (CBs). The initial set of CBs is obtained as a convex visual hull (CVH) or a set of voxels. Next, we iteratively project and intersect 104 the CBs with the silhouettes from every viewpoint. The intersections between the projected CBs and the silhouettes are decomposed into 2D convex polygons. The viewing cones corresponding to each convex polygon are then used to decompose and refine 105 the original CBs to obtain the next set of CBs. These two steps are performed iteratively for each of the N images.

Finally, the union of the set of CBs represents the visual hull of the object 106. The above steps can be performed in a processor connected to a memory and input/output interfaces as known in the art.

Initialization by Computing a Convex Visual Hull

Our method starts by determining a coarse 3D model using information from all the silhouettes as follows. Let $C^h_i$ denote the 2D convex hull of the contour $C_i$, and $V^h_i$ denote a corresponding viewing cone. We define the convex visual hull (CVH) as the intersection of all viewing cones corresponding to the convex hull of each silhouette:

$$CVH = \cap V^h_i. \tag{3}$$

If $e^h_{ij}$ denote the edges in the 2D convex hull $C^h_i$, then each visual cone $V^h_i$ represent an infinite cone in 3D, given by $$X: a^h_{ij}x \leq d^h_{ij}, \text{ for all } j. \tag{4}$$

Thus, generating the CVH amounts to combining the inequalities from all the silhouettes and solving a single linear program $$x: a^h_{ij}x \leq d^h_{ij}. \tag{5}$$

Figure 2:
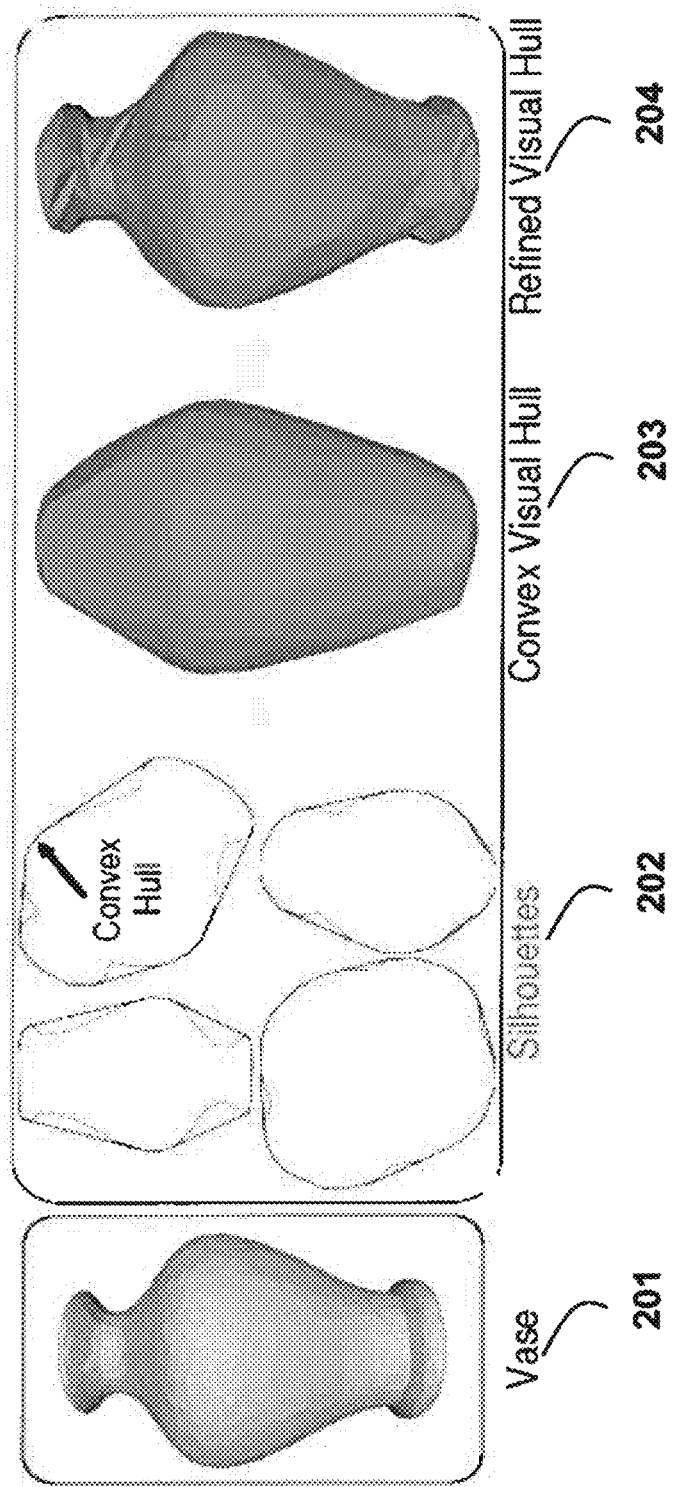
FIG. 2 is a schematic of a method for generating a visual hull of an example object according to embodiments of the invention.

FIG. 2 shows the steps for generating a visual hull 204 for a 3D object 201 (vase). The CVH 203 is obtained by intersecting the visual cones corresponding to the 2D convex hull of each silhouette 202. Here a subset of four silhouettes and their 2D convex hulls is shown. The silhouettes are converted into polygons by fitting lines to contour points. Note that the CVH is not the convex hull of the actual 3D object, which is hard to obtain with finite number of views. CVH can be seen as an approximate convex hull of the actual 3D object.

The CVH is then refined to obtain the final visual hull (VH) 204 using all the silhouettes. Note that VH cannot be same as the CVH that we generate. The VH is a tighter approximation of the object compared to CVH. If the object is convex, $C^h_i = C_i$, and CVH=VH.

The CVH can be generated by solving a single linear program, rather than several pair-wise intersections of visual cones. Our CVH is a more accurate initialization of the object compared to voxel carving methods, which initialize the shape with a bounding cube containing the object, leading to inaccuracies.

The set of vertices in the 2D convex hull of the occluding contour $C^h_i$ is a subset of vertices of the original contour $C_i$. However, the edges in the occluded contour $C^h_i$ can or cannot be present in C. Thus, the CVH and VH share those 3D vertices and faces whose projection is common to the contours $C^h_i$ and $C_i$. The CVH has extra faces, which project outside the 2D silhouettes, and lack vertices and faces in VH that correspond to silhouette concavities.

Refinement by Partitioning into Convex Bricks

The second step is to refine the CVH using information from all the silhouettes. We intersect the visual cone of each silhouette with the CVH to remove 3D regions that project outside the silhouette. However, because silhouettes can be non-convex and possibly have holes, such direct 3D-3D intersections are difficult.

We simplify such 3D-3D intersections using information from 2D intersections. The method is started with only one convex brick (polyhydron), the CVH. The silhouettes are processed one by one, and each silhouette is used to refine the current 3D model by potentially decomposing it into multiple convex bricks.

Without loss of generality, we assume that we have $K_i$ convex bricks $B_1, \ldots, B_{Ki}$ describing the object after processing $i^{th}$ the silhouette. Thus, $K_0 = 1$, and $B_0 = CVH$.

Silhouette Processing

Given the $i^{th}$ silhouette $C_i$, each convex brick $B_j$ processed independently. To determine the 3D intersection of $B_j$ with the visual cone corresponding to the current silhouette, we first project $B_j$ onto the silhouette. This results in a 2D convex polygon $P(B_j)$, where P denotes the projection operator. Next, we determine the intersection $S_{ij}$ of the projected convex polygon $P(B_j)$ with the given silhouette $C_i$ $$S_{ij} = P(B_j) \cap C_i. \qquad (6)$$

However, the intersection $S_{ij}$ can be non-convex. Then, we compute a convex decomposition of $S_{ij}$, resulting in $m_{ij}$ convex 2D polygons. Each of these $m_{ij}$ convex regions defines a convex visual cone, which can be intersected with $B_j$ by solving a linear program. Thus, we can simplify the intersection of each convex brick $B_j$ with the visual cone of the given silhouette only by using convex 3D intersections.

Figure 3:
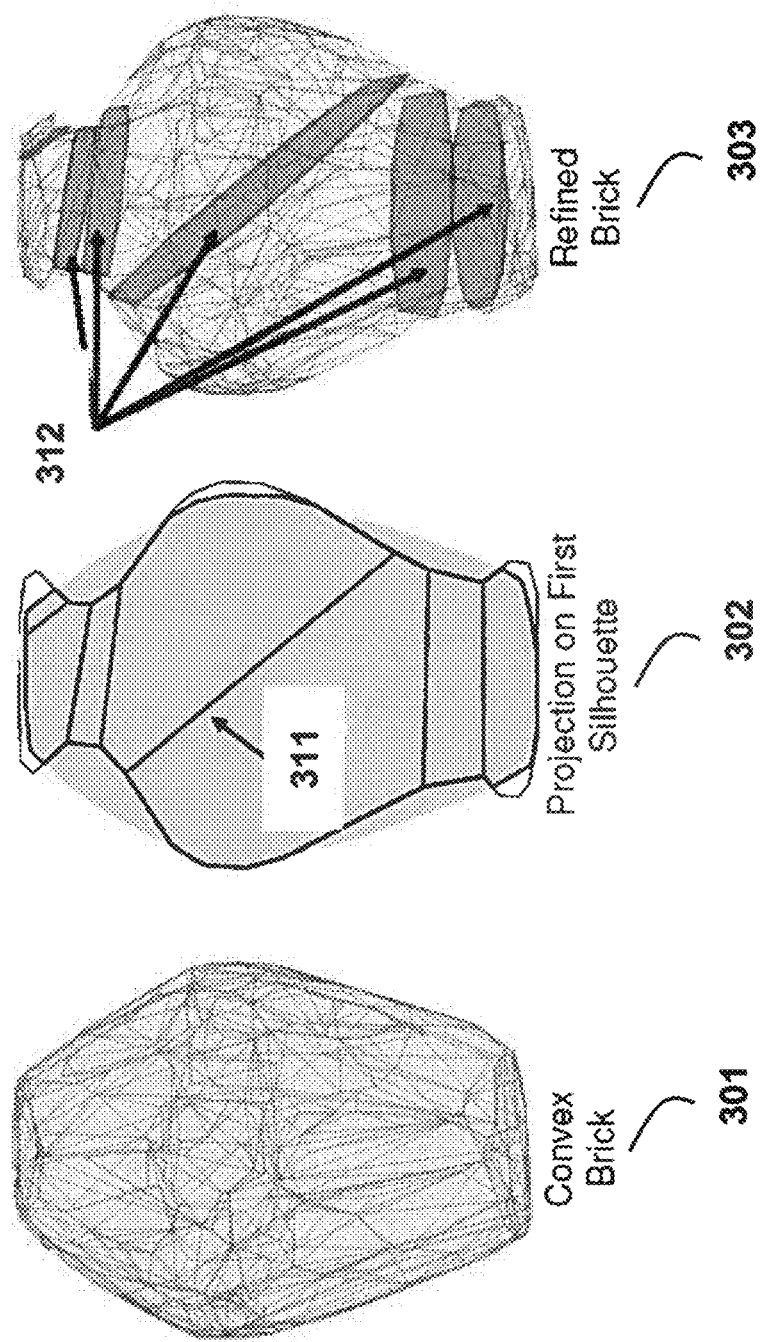
FIG. 3 is a schematic of a process for refining a convex brick using a silhouette according to embodiments of the invention.

FIG. 3 shows this refinement procedure for the first silhouette, where the convex brick (CVH) 301 is refined and partitioned into seven convex bricks. The projected CVH 302 is intersected with the silhouette, resulting in a 2D intersected polygon. The intersection is partitioned into seven convex polygons using internal edges 311, and the CVH is refined into m convex bricks 303. The internal edges 311 result in internal faces 312.

Internal Faces and Edges

The convex decomposition of intersection S introduces the internal edges 311, which are not part of the original silhouette. The internal edges results in the internal faces 312 in the visual hull. These edges project inside a silhouette, as compared to true edges that project on the occluding contour.

However, the internal edges are consistent with the definition of visual hull. Moreover, any convex decomposition of a 3D shape results in internal edges and internal faces to describe the individual convex 3D polyhedron. A key point to note is that the convex bricks share internal faces and do not overlap.

Refining each convex brick $B_j$ requires solving $m_{ij}$ linear programs. The size of each linear program is small, because only a single silhouette is used. Often, the bricks $B_j$ are completely inside the silhouette. In that case, the intersection $S_{ij} = P(B_j)$. Thus, there is no need to determine a convex decomposition of the intersection $S_{ij}$, because it is convex by definition, and subsequent 3D intersections. This occurs as soon as $B_j$ is maximally partitioned, and each new silhouette does not improve the refinement.

Obtaining Surface Mesh

In conventional voxel carving methods, because the shape of each voxel is fixed, an additional method such as marching cubes is required to obtain a surface representation. In contrast, our convex bricks adhere to the shape of the object and directly provide the surface information. To obtain the surface mesh, we remove faces that correspond to internal edges.

Merging Convex Bricks

The two steps described above are sufficient to generate the visual hull as the combination of convex bricks. However, improvement can be made by merging smaller convex bricks into larger convex bricks. This reduces the run time, and the complexity of the convex partitioning of the final visual hull.

We perform merging as follows. If multiple convex bricks are completely inside the current silhouette and share at least one internal face, then these bricks are tested for possible merging. Note that convex bricks do not intersect, but only have common faces.

We determine a new brick by combining the linear equations corresponding to the bricks, removing the equations corresponding to their common internal faces, and solving the linear program. By definition, the new brick is convex. If the vertices of the new convex brick are subset of the vertices of the bricks being merged, then the merging operation is successful. Thus, each merging operation solves a single linear program.

Controlling the Number of Convex Bricks

The shape and number of convex bricks $K_N$ in the visual hull depends on the number of viewpoints N, viewpoint locations, and occlusions in each silhouette. Given a set of silhouettes, $K_N$ also depends on the convex partitioning of the silhouettes. The number of convex bricks increases as more silhouettes are processed, due to the convex partitioning step, which also increases the run time. Therefore, it is desired to reduce the number of silhouettes by decomposing only selected silhouettes.

We can control $K_N$ by replacing the convex partitioning of the intersection $S_{ij}$ with the convex hull of $S_{ij}$ for some silhouettes. This ensures that $m_{ij}=1$ for those silhouettes, and each convex brick is not partitioned, but only refined. If this is done for all silhouettes, then, $K_N=1$, and the VH is the same as the CVH. If this done for all silhouettes except the first, then $K_N$ remains fixed as the number of convex partitions in the first silhouette.

Coarse-to-Fine Part-Based Refinement

In general, the convex partitions of silhouettes do not relate to the intrinsic shape of the object. Because our method can use any convex partitioning, we can perform a part-based refinement of the visual hull in a coarse-to-fine manner. For each edge in the 2D convex hull of the silhouette, we find the 2D vertex of the silhouette, which is most distant from this edge and greater than a pre-defined threshold. This results in a set of vertices representing maximal concavity in the silhouette. These vertices are connected to partition the silhouette into a small number of segments. Then, we determine the convex hull of each of these segments.

Hybrid Approach Using Voxel Carving

The method described above uses the CVH for initializing the construction of the visual hull. In an alternative embodiment, we can use voxels obtained from voxel carving for initialization. Because each voxel is convex, it can be regarded as a convex brick to start with and refined using silhouettes. The voxel initialization produces a different convex decomposition of the resulting VH compared to CVH initialization. Now, the reconstructed VH also contains internal vertices.

Compared to CVH initialization, where all vertices of convex partitions are on the silhouette, the projected voxel vertices modify the 2D convex decomposition by adding new points inside the silhouette. Thus, the convex bricks are more localized after processing the first silhouette. Voxel initialization avoids long thin slivers that might arise due to the convex decomposition of the silhouette when internal vertices are not added.

In addition, the intersection of several projected voxels with the silhouette may be convex, not requiring any partitions. This helps in reducing the number of convex bricks. However, using a fine voxel grid initialization results in a large number of convex bricks.

Voxel initialization also helps in reducing the number of vertices in the final surface mesh. The intersection of projected convex bricks with the silhouette results in new vertices on the silhouette, increasing the number of vertices on the surface. This increase is smaller with voxel initialization, because a fraction of new vertices are added inside the silhouette during convex decomposition. To obtain the surface mesh, we remove all vertices (and their corresponding edges) whose projection lie inside all silhouettes, along with internal faces.

Effect of the Invention

We describe convex bricks (polyhedra) as a novel primitive for visual hull generation. Our method is stable under segmentation and calibration errors, without the need to modify silhouettes and/or local geometry. The method does not require post-processing methods, such as marching cubes to construct a surface mesh.

The method avoids explicit computation of rim, frontier or triple points, and does not require local connectivity and/or orientation information to construct the mesh as in conventional methods.

We generate an exact polyhedral visual hull from polygonal silhouettes. Our method is highly parallelizable, because processing of each convex brick with a new silhouette can be done independently. The 2D polygon intersection method can be replaced by a faster line clipping method.

In addition, incremental LP can further reduce the computation cost, because each new silhouette only adds few inequalities for each convex brick. Similar to octree based methods for voxel carving, the method can use a tree based description for the convex bricks. This provides connectivity information between different parts of the 3D model, and can further improve the merging operation.

Our convex bricks overcome the major drawbacks of voxel carving methods in terms of 3D quantization and aliasing artifacts. At the same time, convex bricks produce high quality visual hulls, and offer several benefits, such as stability under segmentation/calibration errors, coarse intermediate representation and the ability of produce a convex partitioning of the visual hull.

Refinement of 3D parts of the visual hull can be done via refinement of the corresponding silhouette regions. Thus, we bridge the gap between 3D model creation and 3D model processing, e.g., refinement, which are often done independently for computer vision and computer graphic applications.

While we allow convex bricks to take any convex shape, restricting the shape to a set of few convex primitives can be beneficial for certain applications.

Unlike constructive solid geometry (CSG) and voxel carving methods, where an object is defined using a set of fixed 3D primitives such as spheres, cubes (voxels), etc., the shape of the convex bricks in our method depends on the object itself, and is related to the convex hull of the silhouettes.

Starting from a coarse 3D shape, each silhouette trims the 3D model by refining the shape of the convex bricks. Thus, our method generates the visual hull of the object as a convex 3D partitioning of the visual hull, resulting in a watertight mesh. In addition, at any point during the processing, a coarse 3D shape of the object is available.

Using our convex brick as a 3D primitive can be useful in a number of applications. Several inference processes in computer vision applications use super-pixels, instead of pixels for computational benefits, and better spatial support. Similarly, inference processes on graphs constructed using convex bricks as nodes have the potential to provide computational benefits over voxels for applications such as 3D image segmentation and object recognition.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating a visual hull for an object, wherein the object is three-dimensional and the method comprises the steps of:
    extracting a set of silhouettes from a set of images, wherein there is one silhouette for each image;
    generating a set of convex polyhedra as a coarse 3D model of the object, wherein the coarse 3D model is obtained as a single convex polyhedron by intersecting all viewing cones corresponding to the 2D convex hull of each silhouette;
    refining the convex polyhedra by projecting the convex polyhedra to each image and determining the intersections with the silhouette in the image; and
    representing the visual hull of the object as union of the convex polyhedra, wherein the steps are performed in a processor.

2. The method in claim 1, wherein the set of images is acquired at various poses with a camera mounted on a robot arm, wherein the camera is calibrated.

3. The method of claim 1, wherein the set of silhouettes is extracted using background subtraction.

4. The method of claim 1, wherein the set of silhouettes is extracted using object segmentation.

5. The method of claim 1, wherein the set of silhouettes is approximated using a set of polygonal contours.

6. The method of claim 1, wherein the coarse 3D model is obtained as a set of voxels obtained from a voxel carving process.

7. The method of claim 1, wherein the refining further comprises the steps of:
    projecting the current set of convex polyhedra to the image;
    determining intersections between the projection of the convex polyhedra and the silhouette in the image;
    decomposing the intersections into 2D convex polygons; and
    intersecting viewing cones corresponding to each 2D convex polygon with the original convex polyhedra to obtain a new set of convex polyhedra.

8. The method of claim 7, wherein the intersecting is performed using linear programming.

9. The method of claim 1, wherein the size and the number of convex polyhedra are controlled.

10. The method of claim 9, wherein the size of convex polyhedra is balanced by using a set of voxels as the coarse 3D model.

11. The method of claim 9, wherein the number of convex polyhedra is reduced by decomposing selected silhouettes only.

12. The method of claim 9, wherein the number of convex polyhedra is reduced by merging adjacent polyhedra whose union remain convex.

13. The method of claim 1, wherein the convex polyhedra are used for 3D image segmentation.

14. The method of claim 1, wherein the convex polyhedra are used for 3D object recognition.

* * * * *